United States Patent [19]

Rehrig

[11] 3,999,774
[45] Dec. 28, 1976

[54] CART WITH PLASTIC BASKET

[76] Inventor: Houston Rehrig, 1401 Oak Knoll Ave., Pasadena, Calif. 91106

[22] Filed: June 20, 1975

[21] Appl. No.: 588,792

[52] U.S. Cl. .................. 280/33.99 R; 280/79.1
[51] Int. Cl.² ........................................ B62B 3/02
[58] Field of Search ............ 280/33.99 S, 33.99 R, 280/33.99 F, 33.99 B, 36 R, DIG. 4, 79.3, 79.1, 79.2; 220/73

[56] References Cited

UNITED STATES PATENTS

| | | | |
|---|---|---|---|
| 2,689,134 | 9/1954 | La Chance | 280/33.99 S |
| 2,997,311 | 8/1961 | Umanoff | 280/33.99 B |
| 3,019,953 | 2/1962 | Umanoff | 280/33.99 F |
| 3,026,122 | 3/1962 | Young | 280/33.99 H |
| 3,157,871 | 11/1964 | Umanoff | 280/33.99 A |
| 3,390,808 | 7/1968 | Rehrig et al. | 220/73 |
| 3,536,283 | 10/1970 | Lowe | 280/33.99 H |
| 3,706,460 | 12/1972 | Thomas | 280/33.99 F |
| 3,797,861 | 3/1974 | Shoffner | 280/33.99 H |
| 3,844,577 | 10/1974 | Wahl | 280/33.99 R |

Primary Examiner—M. H. Wood, Jr.
Assistant Examiner—David M. Mitchell

[57] ABSTRACT

A cart having a wheeled metal frame and a plastic basket. The two sides, the front, and the bottom of the plastic basket are integrally molded, and are of open lattice construction. An endless metal ring encircles the upper edge of the basket, and also wraps around the corner posts of the metal cart frame to anchor the basket to the cart frame. The bottom portion of the basket is also anchored to the frame. The back panel of the basket is of latticed plastic, and is pivotally attached to the endless metal ring by support wires, which also function as bumpers to protect the plastic back panel during nesting of the carts. The rear edges of each side of the basket conform with the rear posts of the frame. A child's seat is incorporated into the back panel of the basket.

51 Claims, 27 Drawing Figures

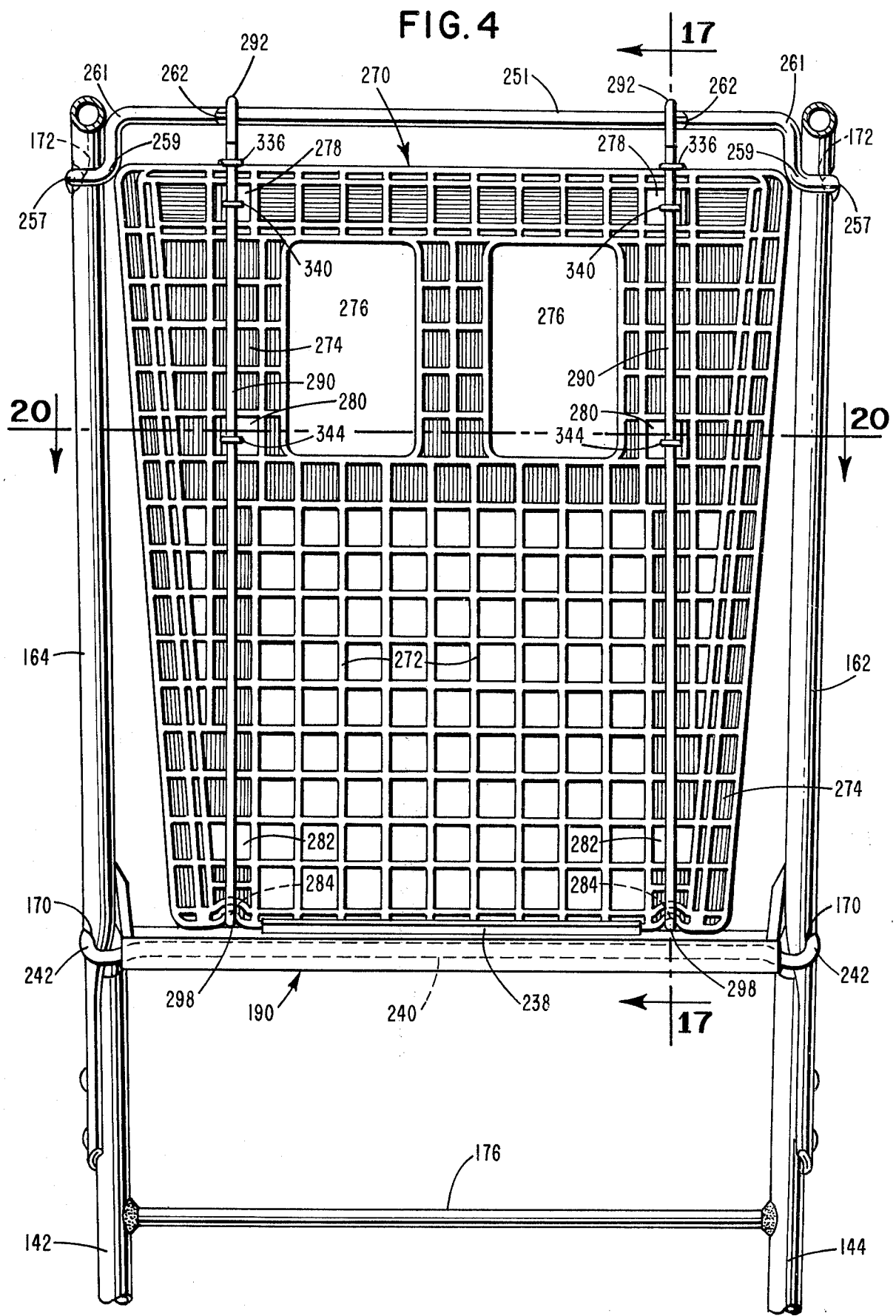

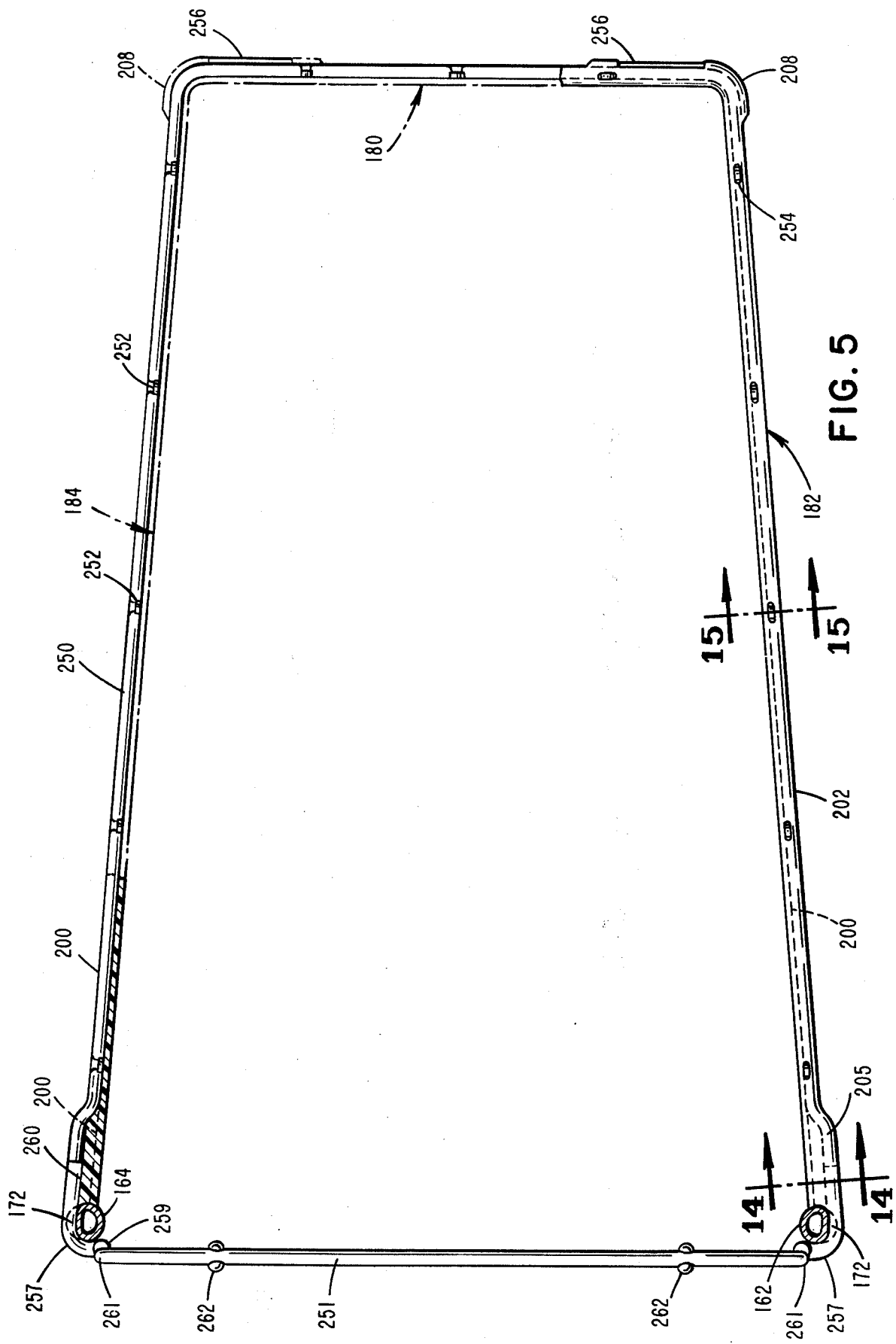

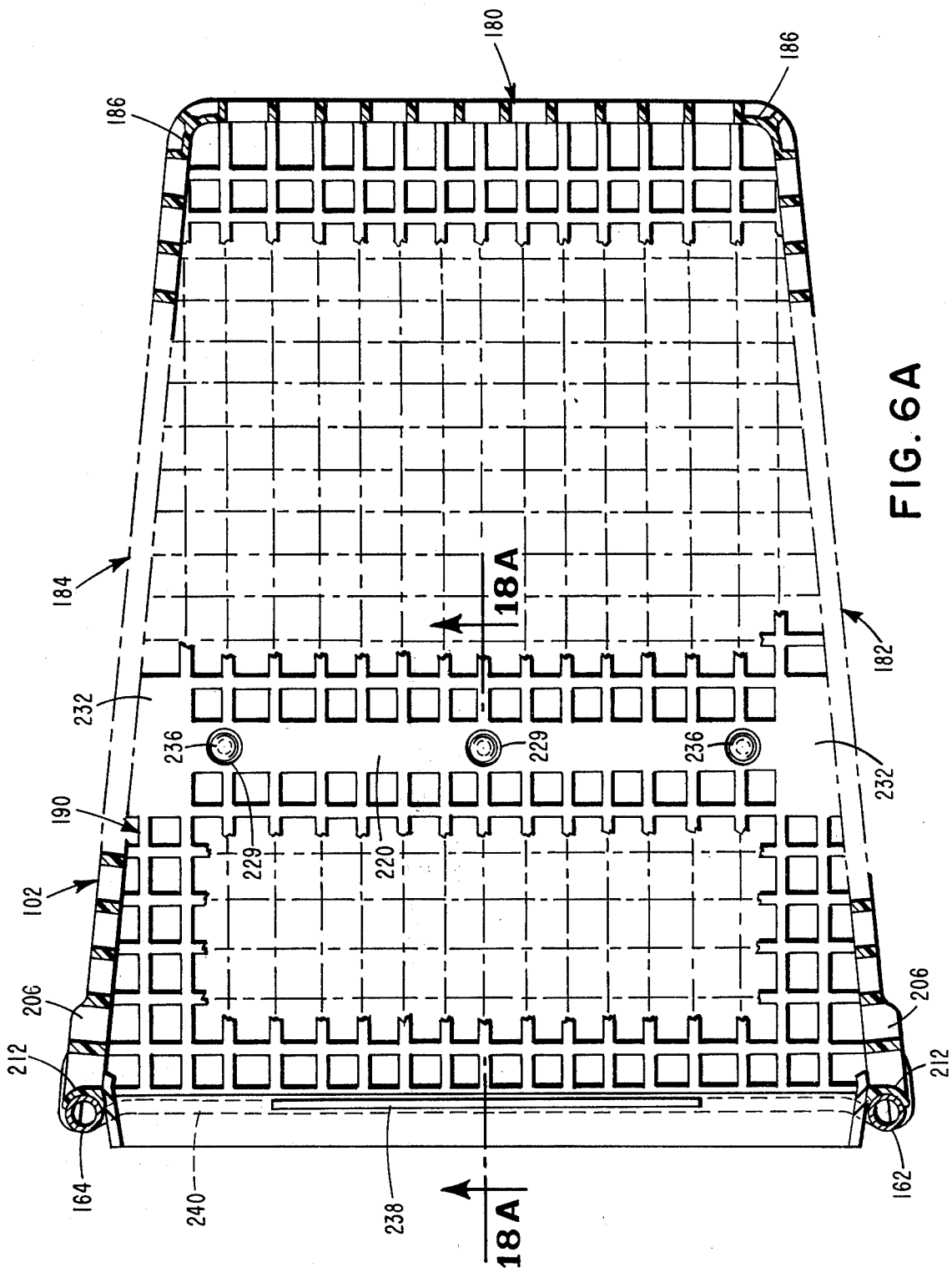

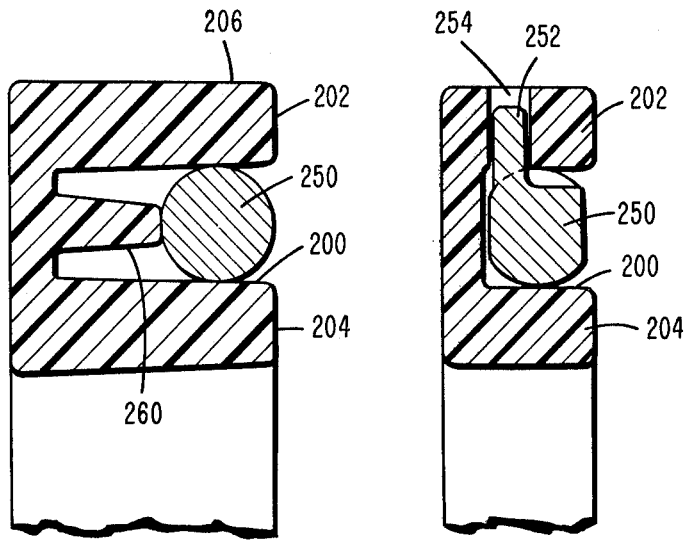
FIG. 14
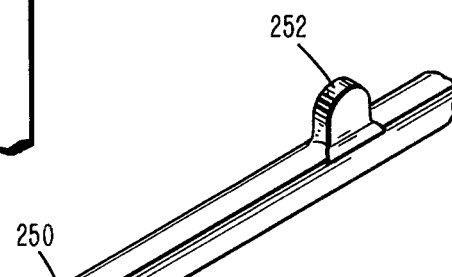
FIG. 15
FIG. 16
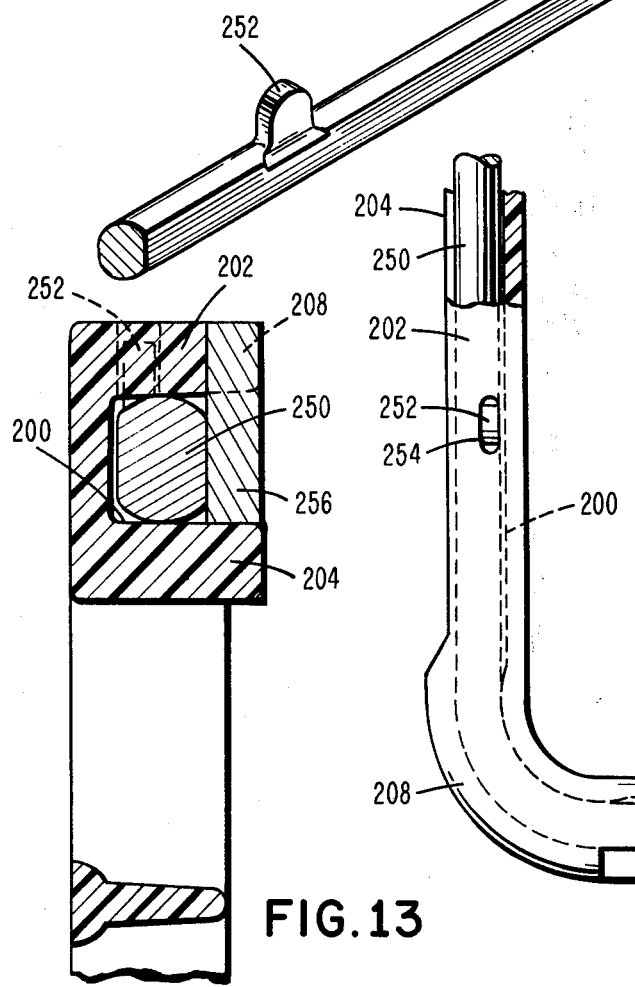
FIG. 7
FIG. 13

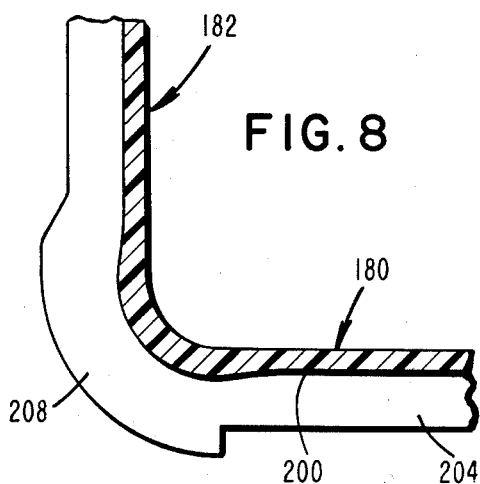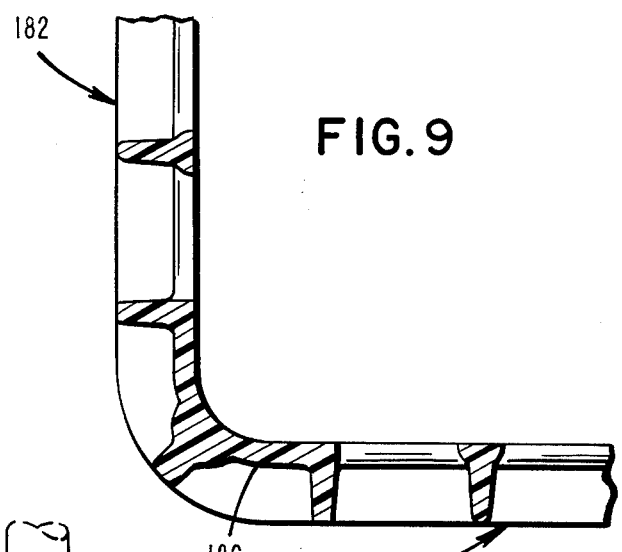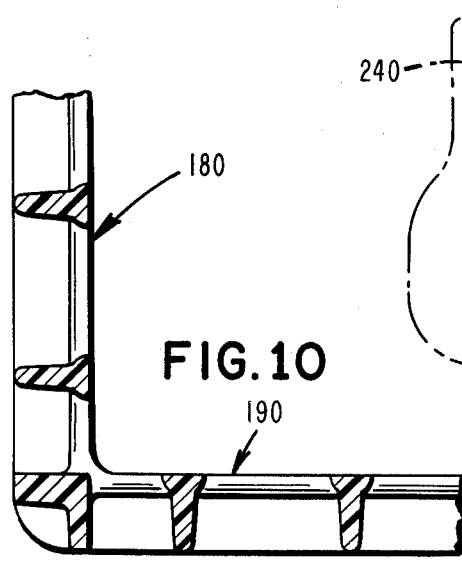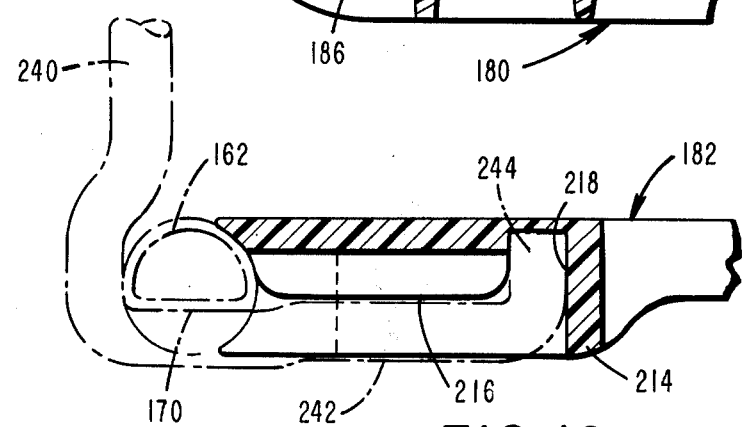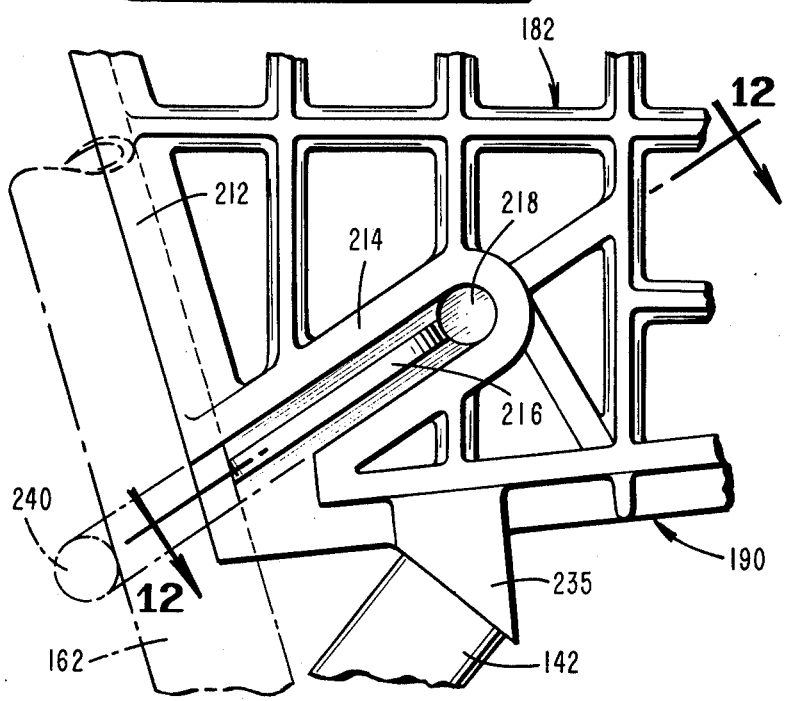

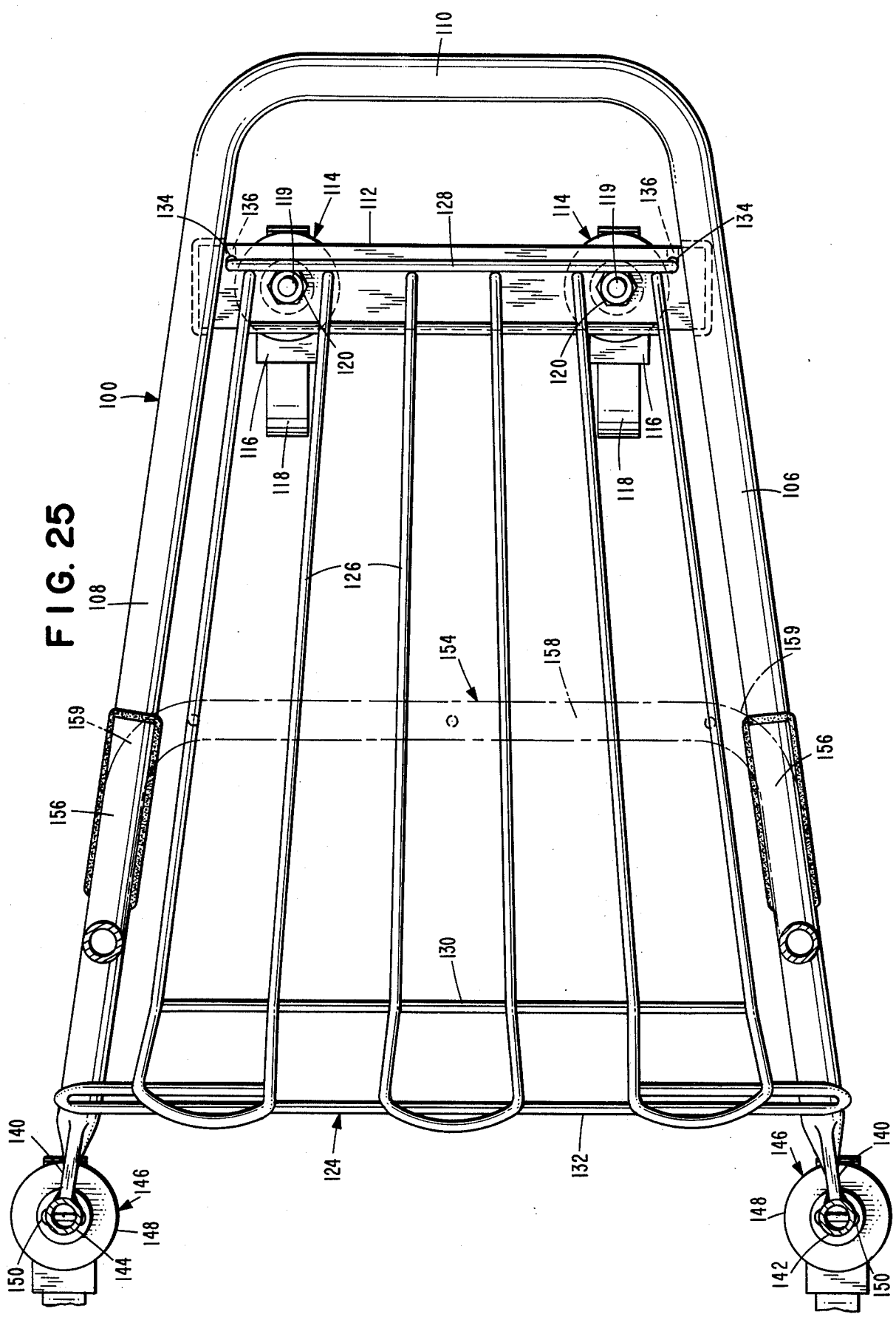

CART WITH PLASTIC BASKET

BACKGROUND OF THE INVENTION

The invention relates generally to the field of carts used for supermarkets and the like, and is directed particularly to a new and novel cart having a metal frame and a plastic basket.

Ideally, carts of this type, and particularly those used in supermarkets and grocery stores, should have the following characteristics. First, they should be able to withstand a great deal of abuse, particularly to the basket portion. Carts are continuously impacted with one another and with stationary objects. Second, the carts should be easy to push and to maneuver. The condition of the wheels has a great effect on this characteristic, but so does the weight of the cart. Third, the carts should be of such design and such surface finish as not to have a propensity to collect dirt and contaminants. Fourth, the carts should be able to withstand cleaning by strong detergents or steam. Fifth, the carts usually must have sides of openwork construction, because customers wish to be able to observe the contents of the carts from any angle. Sixth, the carts should be attractive and should maintain their attractiveness over a long period of time.

For the most part, the carts present in the prior art comprise a tubular metal frame to which is attached a basket of open wire-work construction. The wires are in various crossing patterns, and they are usually welded together at the crossing points. Heavier wire reinforcement is used where necessary. Conventionally, the cart frame and the basket are integral with one another, that is, the basket wires and the frame components are welded together at appropriate points, or the wires are interlocked with the frame components. To promote cleanliness and attractiveness, the entire cart is chrome plated. Sometimes plastic or rubber bumpers are installed at strategic points, such as corners.

The prior art carts do not satisfy all of the requirements set forth above. The deficiencies have chiefly to do with the basket portion. The wires in the basket are welded at the crossing points, and the basket is then chrome-plated, the latter to provide a smooth, cleanable, attractive surface. The welding process for such an item is intricate, as is the plating process. It is therefore not uncommon to have welds and plating of marginal quality so that, upon hard impact, or upon a series of impacts over a period of time, wire welds and the plating are broken. The plating is also subject to being removed by wear and by scraping against other objects. This allows the base metal to rust. Also, if the basket is used in an environment where corrosion of metals is a problem, such as in grocery stores, the base metal exposed at the broken plating and broken welds will corrode. The cart, and particularly the basket, then becomes unsightly and unattractive. At those same exposed points, food particles can become entrapped in small cracks and crevices, even if the baskets are periodically cleaned, resulting in an unsanitary condition. In addition, articles placed in the basket can become pinched or snared by the unsecured wires and plating, causing inconvenience for the customer and inflicting damage to the goods. Impacts also frequently cause the basket to be deformed inwardly, giving rise to all of the above problems.

Repair of cart baskets is a problem in itself, because it is difficult to bend the wires back into shape, and it is difficult and expensive to reweld and replate them. The cart frame and the basket are often integral with one another in prior art carts, and therefore they cannot easily be taken apart to allow repair or replacement of components. To replace the basket, welds must be broken, then replaced. Or, complicated bending and interlocking of wires is necessary during disassembly and assembly. Usually, the cart is simply not repaired. When it becomes too unsightly or too unsanitary to be used, it is discarded. The loss of the entire cart for the sake of the basket is certainly uneconomical.

Prior art carts are also quite heavy, making them difficult to push and to maneuver, especially if they have some malfunction of the wheels.

The prior art carts, when in prime condition, meet some of the above requirements. However, they deteriorate rather quickly, and soon become unsatisfactory in a number of these areas.

SUMMARY OF THE INVENTION

It is the overall object of this invention to provide a new and improved cart which overcomes the disadvantages of the prior art devices.

A specific object of this invention is to provide a new and improved cart in which the basket is not easily damaged by impact.

Another specific objects is to provide a new and improved cart in which the basket is easy to clean.

Still another specific object is to provide a new and improved cart in which the basket is easily replaced.

A further specific object is to provide a new and improved cart which is lighter in weight than prior art carts.

A still further specific object is to provide new and improved cart in which can be nested and unnested.

Another specific object is to provide a new and improved cart which is less noisy than prior art carts.

Another specific object is to provide a new and improved cart which is more attractive than prior art carts, and which maintains this attractiveness over a long period of time.

This invention comprises a cart having a wheeled metal frame and a basket of plastic material. The metal frame is primarily of tubular construction. It has four caster wheels, a lower package shelf, a pair of upstanding rear corner posts that terminate in a handle, and a basket base support member. Advantageously, the frame is of chrome plated steel construction, but other appropriate metals and/or other acceptable finishes can be used.

The cart basket is made of plastic, such as polyethylene, which is strong, light-weight, has a smooth finish, and can deform somewhat to absorb impact and then return to its original shape. The sides, front and bottom of the plastic basket are integrally molded in one piece. Thus there are no seams to break, or cracks and crevices to collect dirt. The plastic does not rust or corrode under the influence of food acids and the like. The use of a plastic basket has been found to reduce the weight of an average cart by at least fifteen pounds.

The basket is almost entirely of open lattice construction, which further lightens it, and which allows the contents of the basket to be viewed from any angle. Rigidity is provided to the basket by the use of suitable integral strengthening ribs, and also by a novel interrelationship between the basket and the metal cart frame, and other components. The rearmost edges of each side panel of the basket are contoured in cross-section to mate with the configuration of the upstanding frame rear corner posts. This provides vertical stiffness to the basket structure, without the inclusion of additional members. The basket is attached at the top to the frame posts by metal ring means that extend around the basket and engage the frame posts. The ring means presses the rear edges of the basket sides against the posts. It also adds rigidity to the basket. The ring means preferably comprises an endless ring that encircles the basket and the frame posts. The lower portion of the basket is urged against the posts by a metal attachment member, which also runs beneath the rear edge of the bottom panel to provide support there. Support for the bottom panel is also provided at its center by a frame support member. The bottom panel is riveted to the supporting frame member.

The rear basket panel is pivotally mounted between the frame posts. It is backed by a pair of support wires, which are pivotally attached to the endless ring. The rear panel support wires also support the child seat, and they act as bumpers during nesting so that the plastic rear panel is protected. The child seat has a wire frame, with a plastic seat panel.

One of the key features of this invention is the fact that the basket can be replaced, if necessary, and further, that it can be replaced quite easily. The main portion of the basket, that is, the integral sides, front and bottom panel, can be removed by simply breaking it apart. A new basket is deformed inwardly, and then slipped within the confines of the endless ring. The auxiliary hardware is then reinstalled. The rear basket panel is also easily replaced. This operation is explained in detail in the following pages. Thus, damage to the basket does not require that the entire cart be discarded.

Another advantage is that the plastic basket can be made in a variety of bright colors. This makes the cart more attractive. It also makes the cart more visible, which reduces accidents both inside the store and outside on the parking lot.

The noise produced by movement of the inventive cart, or by impacting it with other carts or other objects, is considerably less than with prior art carts.

BRIEF DESCRIPTION OF THE DRAWINGS

FIG. 4 is a rear elevational view of the basket of the grocery cart of FIG. 1 taken along line 4—4 of FIG. 1.

FIG. 5 is a top plan view, partially in section, of the top edge of reinforcing ring of the grocery basket of FIG. 1.

FIG. 6A is a top plan view of the bottom panel of the grocery cart basket, taken along line 6A—6A of FIG. 1.

FIG. 7 is a top plan view of a front corner of the basket, taken along line 7—7 of FIG. 3.

FIG. 8 is horizontal sectional view of the corner of the basket, taken along line 8—8 of FIG. 3.

FIG. 9 is a horizontal cross-sectional view of a front corner of the basket taken along line 9—9 of FIG. 3.

FIG. 10 is a vertical cross-sectional view of a portion of the front of the basket taken along line 10—10 of FIG. 3.

FIG. 11 is a fragmentary side elevation of the lower rear corner of the side of the basket, as encircled at 11 in FIG. 1, with the attaching wire removed.

FIG. 12 is a sectional view taken along line 12—12 of FIG. 11.

FIG. 13 is a sectional view taken along line 13—13 of FIG. 7, showing the relationship between the reinforcing ring and the upper edge of the grocery cart basket.

FIG. 14 is a sectional view of a portion of the upper edge of the grocery cart basket, taken through line 14—14 of FIG. 5.

FIG. 15 is another sectional view of the relationship between the reinforcing ring and the upper edge of the grocery cart basket, taken through line 15—15 of FIG. 5.

FIG. 16 is a perspective view of a portion of a reinforcing ring utilized at the upper edge of the grocery cart basket shown in FIG. 1.

FIG. 25 is a view taken along line 25—25 of FIG. 1, showing the base portion of the grocery cart frame.

DESCRIPTION OF THE PREFERRED EMBODIMENT

Figure 1:
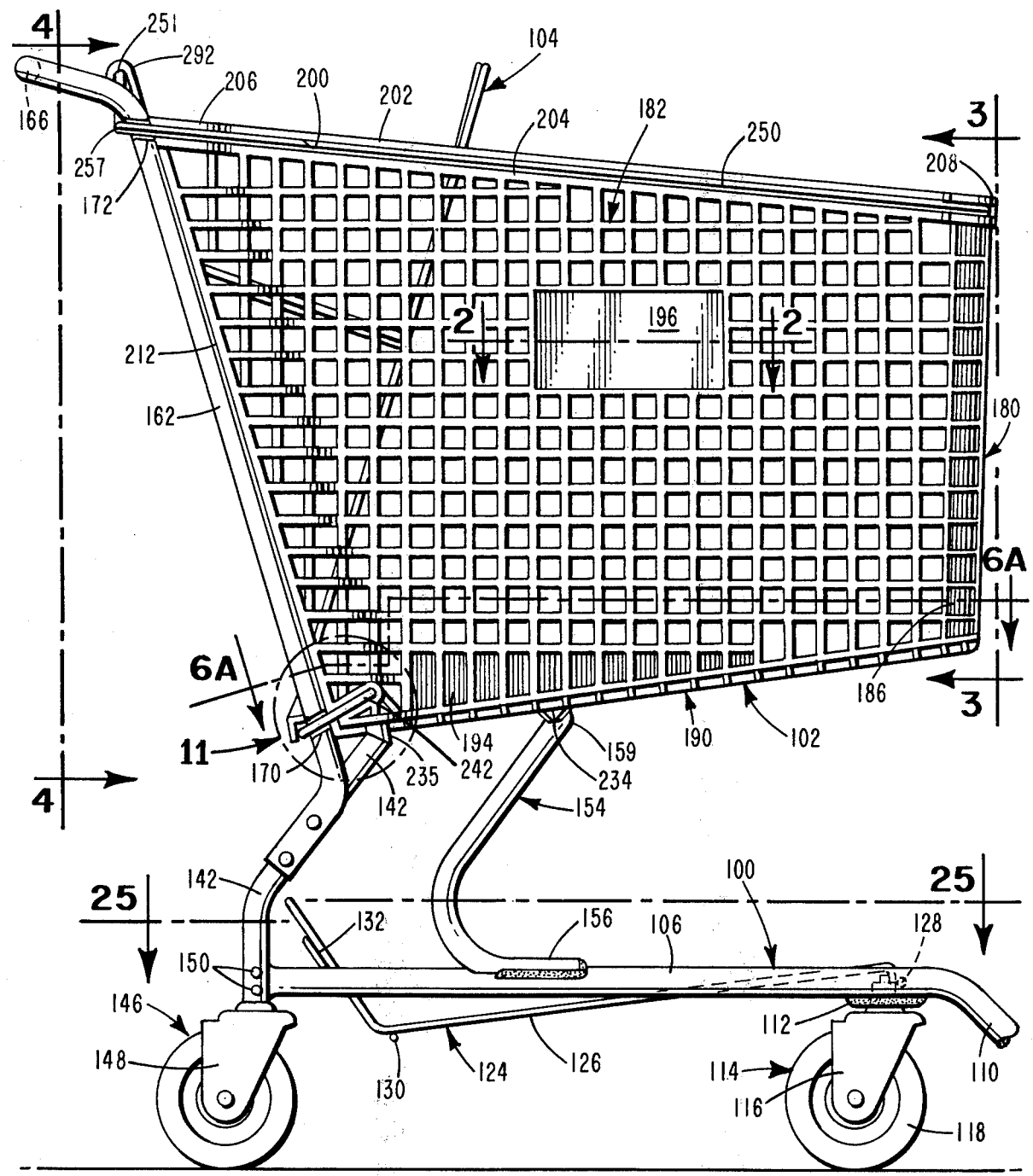
FIG. 1 is a side view of the grocery cart of this invention.
Figure 2:
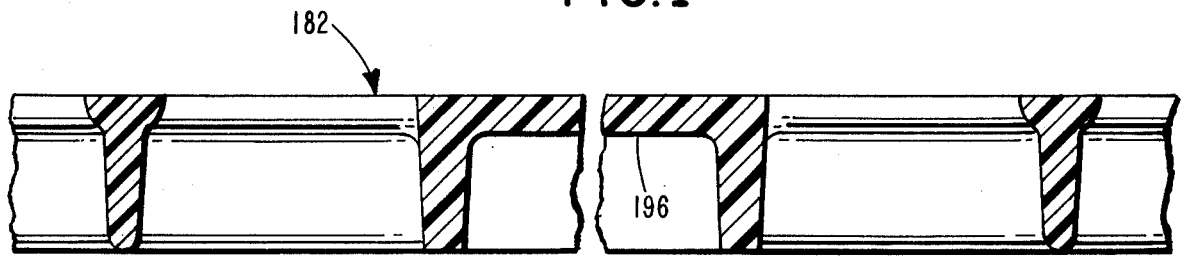
FIG. 2 is sectional view taken through line 2—2 of FIG. 1.

The grocery cart which is the subject of this invention consists of a number of interrelated elements, all of which are shown in at least some detail in FIG. 1. Each component will be explained in detail below. Basically, the inventive grocery cart consists of a frame portion 100, a basket component 102, and a child seat component 104.

Looking first to FIGS. 1 and 25, the base portion of frame 100 comprises a pair of spaced, slightly convergent frame side members 106 and 108 which are joined together by a frame front member 110. Adjacent to the point of juncture with member 110, each of frame front members 106 and 108 have a downwardly curved portion so that the elevation of member 110 is less than that of members 106 and 108. This is so that in the nesting of a plurality of gorcery carts the lower package shelf on the cart ahead will be engaged by the cart behind and pivoted upwardly. It also acts as a bumper to protect the grocery cart wheels. As is clearly shown in FIG. 25, frame side members 106 and 108 converge toward one another, so that a plurality of grocery carts can be nested together. Attached to the forward portion of frame side members 106 and 108 is a front wheel support member 112, which can be attached by welding or by other suitable means. Attached in a conventional manner to wheel support member 112 are a pair of front caster 114, each comprising a caster member 116, upon which is mounted a wheel 118.

Each of the casters 114 is attached to wheel support plate 112 by means of an upwardly extending bolt 119 which passes through an opening in plate 112, and which is capped by a nut 120. The casters 114 are of the swivel type commonly found in conveyances of this general kind. Also supported between members 106 and 108 is a lower package tray 124, which comprises a plurality of wires 126 connected together at one end by a pivot wire 128, and at the other end by a brace wire 130 and a support wire 132. Pivot wire 128 includes downwardly and forwardly turned portion 136 that are received in openings 134 in wheel support member 112. Thus, package tray 124 is pivotally anchored at its forward edge to member 112. At its rearward edge, support for package tray 124 is provided by support wire 132, portions of which extend outwardly over frame side members 106 and 108. As shown in FIG. 1, the rearward portion of wires 126 are oriented upwardly at a angle to frame members 106 and 108, so that when the carts are nested, contact by frame member 110 causes package tray 124 to be pivoted upwardly to allow a plurality of carts to be nested.

At their rearwardly extending free ends, each of frame side members 106 and 108 terminates in a flattened portion 140. A pair of upwardly extending rear basket support members 142 and 144 are attached as by welding to flattened portions 140. Rear basket support members 142 and 144 are preferably of tubular construction, although other cross-sectional configurations may be utilized. A pair of rear casters 146 are supported in the open ends of each of rear basket support members 142 and 144. Each rear caster 146 comprises a wheel support 148 and an upwardly extending rod, not shown, which is inserted into the open end of each of members 142 and 144, and is secured therein by means such as rivets 150 or the like. Rear casters 146 are generally not of the swiveling type, but are fixedly oriented.

Figure 3:
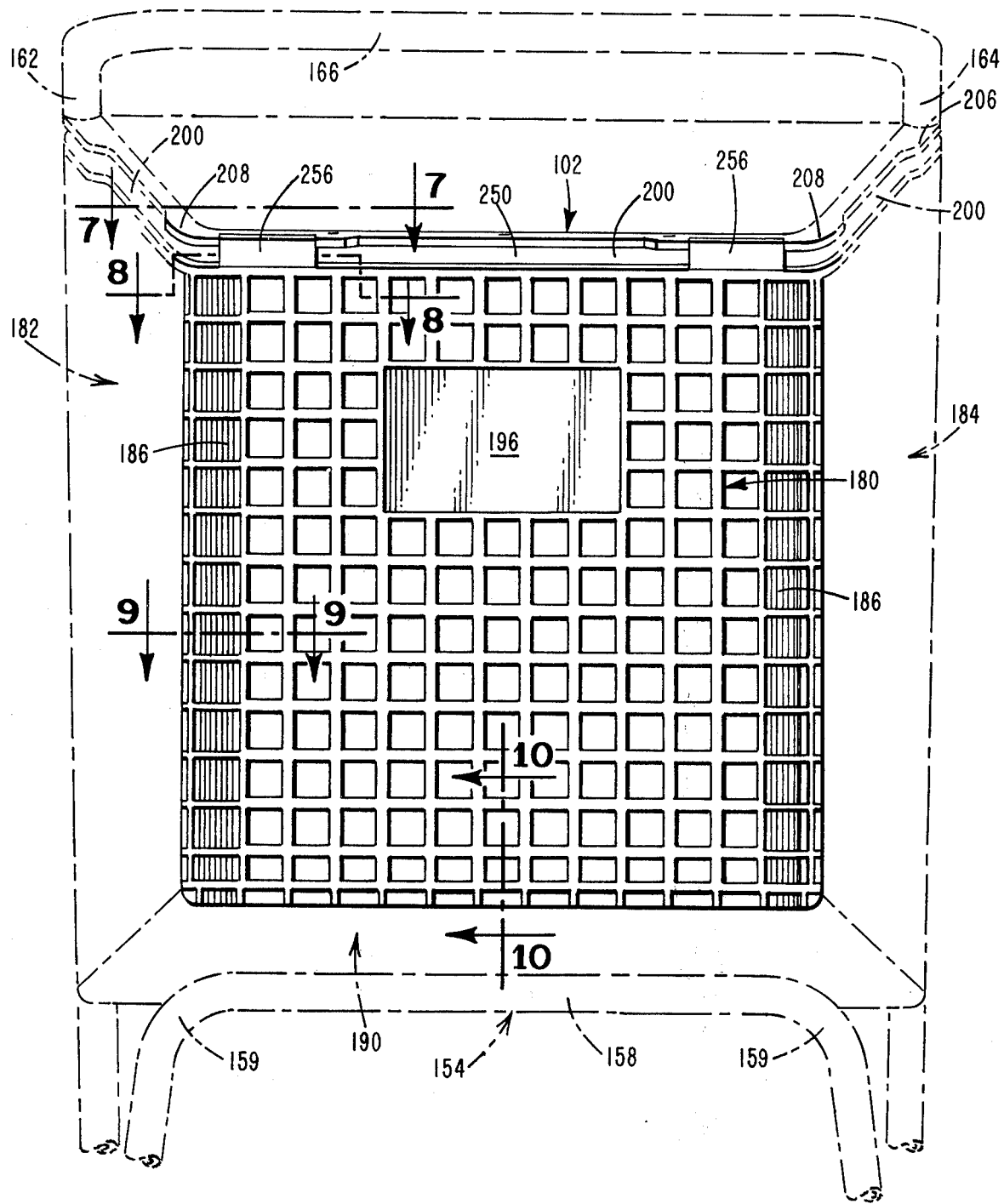
FIG. 3 is a front elevational view of the basket of the grocery cart of FIG. 1, taken along line 3—3 of FIG. 1.

A front basket support member 154, best shown in FIGS. 1 and 3, is of generally U-shaped configuration and is attached as by welding at its free ends 156 to the top of each of frame side members 106 and 108. Basket center support member 154 also comprises a center portion 158 having curved corner sections 159 which engage and support the basket.

The final portion of frame 100 comprises a pair of rear posts 162 and 164 which are joined together at the top by a handle portion 166. The rear posts are best shown in FIGS. 1, 4 and 6A and 6B. At their lower ends, rear posts 162 and 164 are attached to the rear basket support members 142 and 144 by means such as riveting or bolting. Each of the rear posts 162 and 164 is provided with a lower recess 170 and an upper recess 172. Rigidity is added to the structure by a post brace rod 176 (FIG. 4), attached by means such as welding. All of the elements of the frame 100 are advantageously manufactured of tubular steel or the like, which is chrome plated for appearance and cleanliness.

The basket component 102 is advantageously manufactured of a plastic material such as polyethylene. The properties of polyethylene are ideally suited to this application, for polyethylene is relatively strong, but panels manufactured of it are flexible enough to absorb some deformation, such as caused by impact, without breaking. However, other materials having similar properties can also be used. The basket comprises two side panels, a front panel, a bottom panel, and a rear panel. The side, front, and bottom panels are injection molded, integral with one another, in a single unit. The rear panel is not integrally attached to the other panels. In order to facilitate the cleaning of the basket, and to allow the user to observe the goods placed in the basket, the basket 102 is of open lattice work structure. The lattice can be any one of a multitude of patterns. As shown herein, the pattern is in squares. Typically, such patterns would be composed of one inch squares. The ribs that define the lattice pattern are of some depth, perhaps one half inch, and could have a width of about one eight inch. Basket 102 comprises a front panel 180 and side panels 182 and 184. At the corners, the latticework is an overlay upon solid corner portions 186, which give rigidity and strength at key points. Bottom panel 190 is integrally attached to panels 180, 182 and 184. It is also of open lattice construction, except for certain solid portions. Additional solid portions 104 are also present to add strength to the side panels, and a solid portion 106 can be added for the purpose of carrying a label or advertising.

A channel 200 extends around the top edge of the basket 102, defined by a pair of horizontally extending shoulders 202 and 204. Side panels 182 and 184 include at each of their rear edges widened sections 206, and at their forward corners widened sections 208. The function of these widened portions is to act as bumpers against adjacent objects. Each of the rear edges of side panels 182 and 184 terminate in a corner member 212 which is concavely curved to engage rear posts 162, 164. This adds rigidity to the plastic basket 102 and prevents the basket from moving laterally with respect to the frame (see FIGS. 6A and 6B). Other conforming configurations might also be used, however. The lower rear corner of each of the side panels 182 and 184 is provided with a U-shaped rib 214 which defines an angularly oriented channel 216, at the end of which is an inwardly extending opening 218 (see FIG. 11).

Figure 6B:
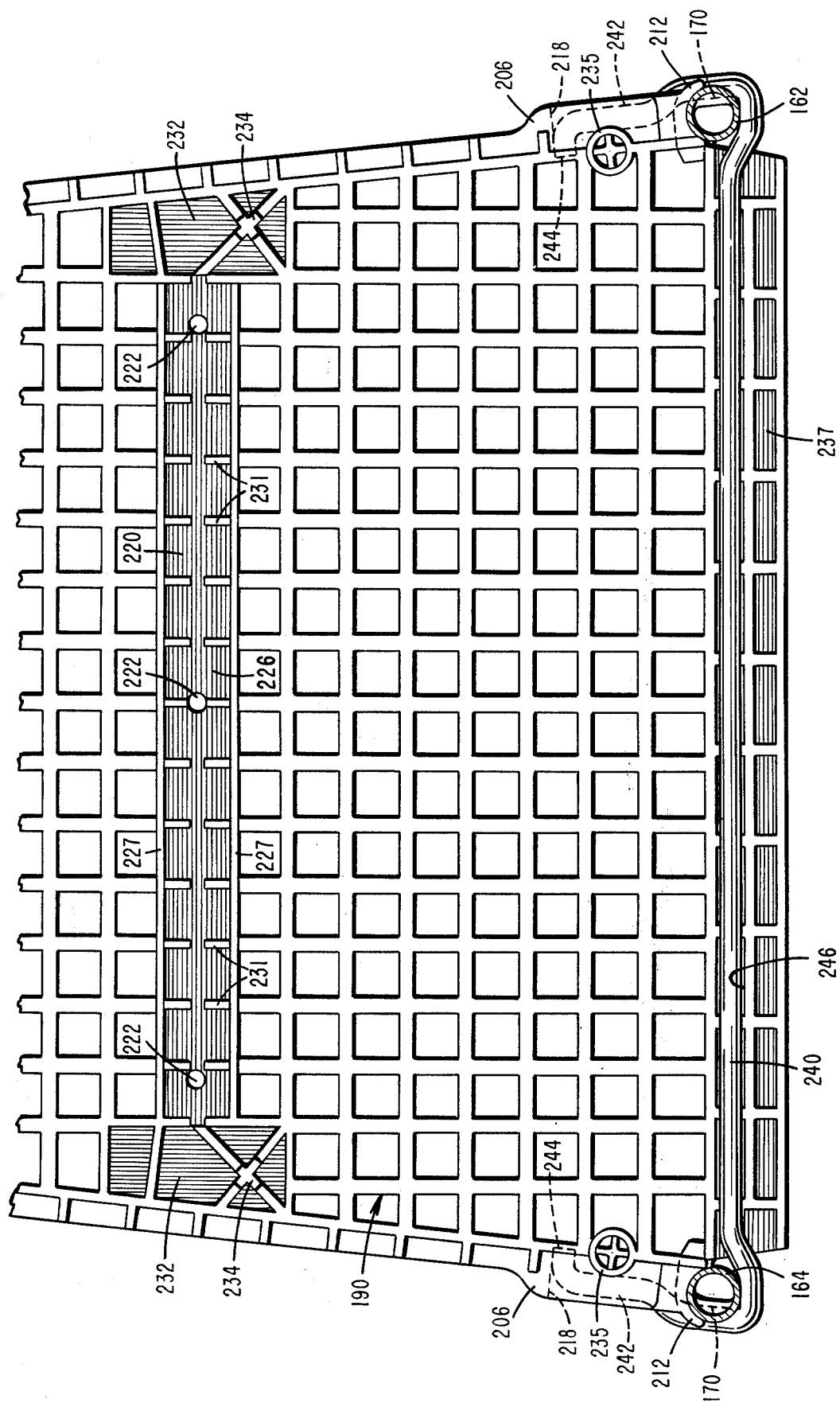
FIG. 6B is a bottom plan view of part of the bottom panel of the basket.
Figure 18A:
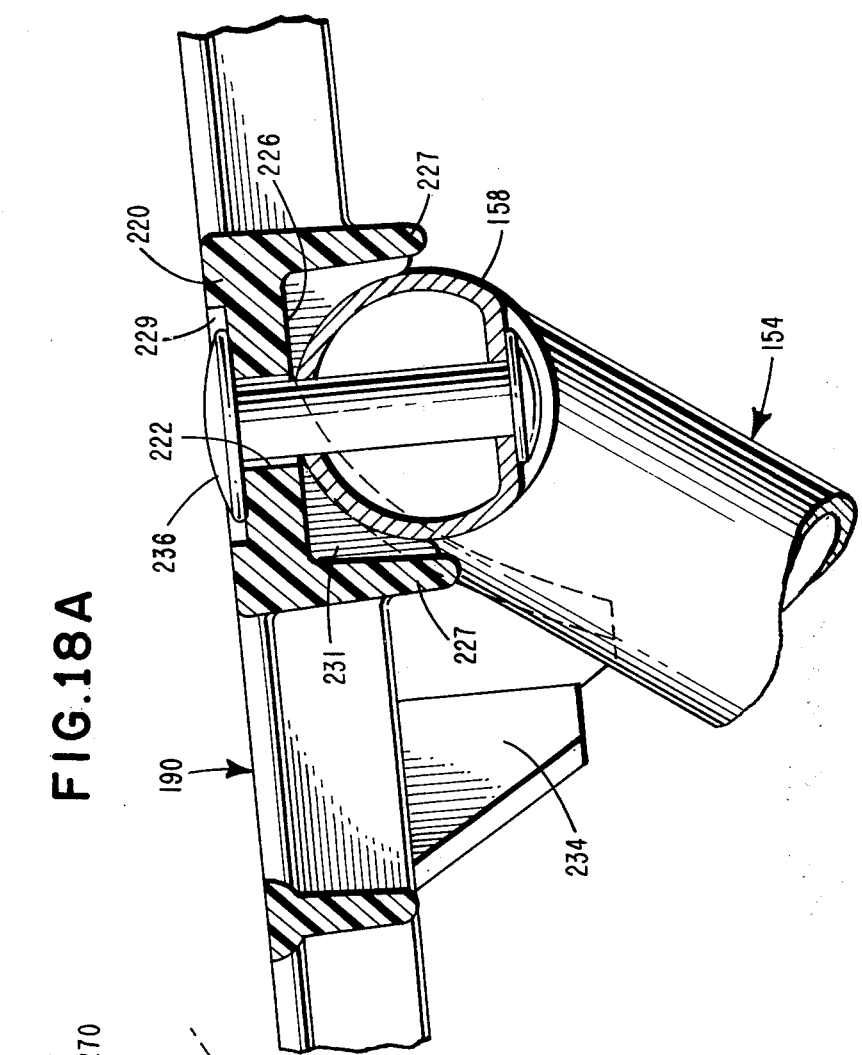
FIG. 18A is a sectional view taken along line 18A—18A of FIG. 6A.
Figure 18B:
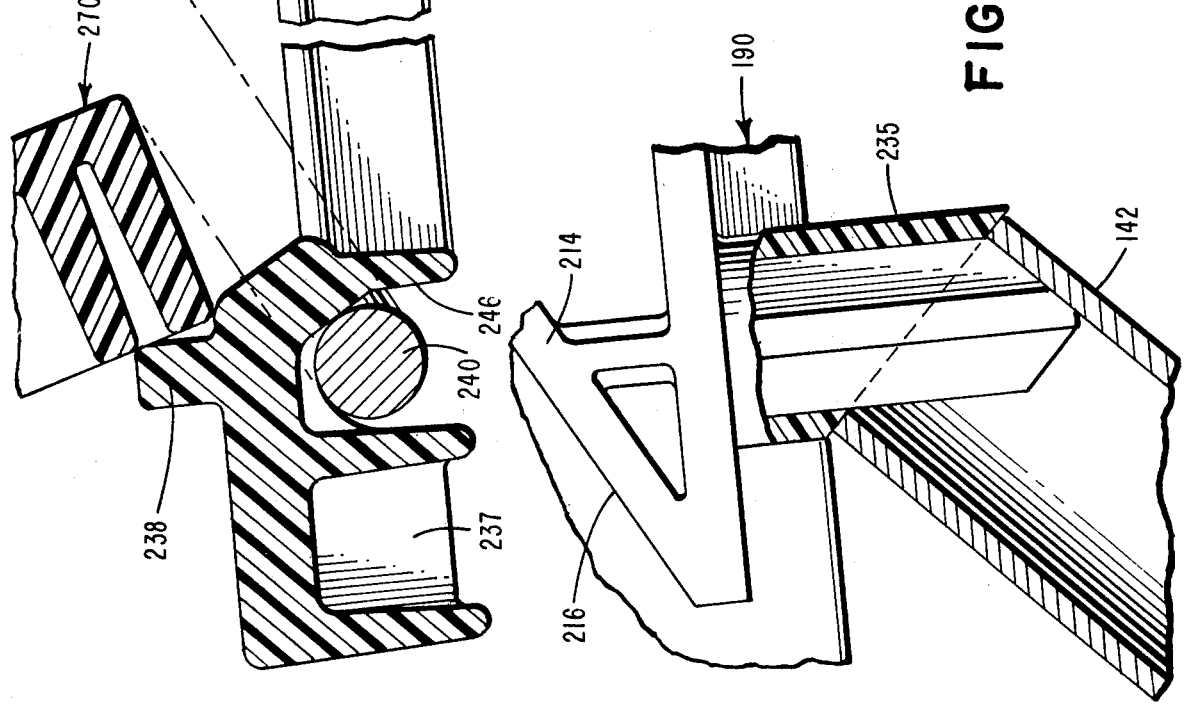
FIG. 18B is an enlarged fragmentary view of the lower rear corner similar to FIG. 11 and partially in section.

FIG. 6A and FIG. 6B show respectively, the top and bottom of panel 190 in detail. A solid portion 220 spans bottom panel 190 at the point of engagement of basket center support member 154. Portion 220 includes three openings 22 receiving screws or rivets that attach bottom panel 190 to center support member 158. The underside of portion 220 is provided with a channel 226 (FIGS. 6B and 18) for receiving center support member 158. Channel 226 is defined by a pair of downwardly extending ribs 227, and support member 158 is cradled therein in a plurality of cut-out ribs 231. Advantageously, the upper surface of portion 220 is provided with recesses 229 about each of the openings 22, so that the heads of the fastening members 236 may be flush with the surface. Panel 190 is also provided with a plurality of solid portions 232, which support on their undersides a pair of downwardly extending protuberances 234 that engage the curved portion 159 of the center support 154. These align the basket and prevent lateral movement of the basket with respect to support 154. A second set of downwardly extending protuberances 235 are positioned near the rear edge of panel 190, and these engage the free end of rear basket support members 142 and 144, to facilitate alignment of the basket in the cart frame and to prevent lateral movement with respect thereto. An upwardly oriented flange 238 is mounted along the center of the rear edge of bottom panel 190 to limit the outward pivoting movement of the back panel. A rear channel 237 open downwardly along the rearmost edge of bottom panel 190.

It is very important to have a strong basket, one that will withstand impact and high loading. Therefore, the basket must be provided with reinforcement. Some reinforcement is provided by way of the construction of the basket itself. But, in this invention the weight of the basket is kept to a minimum, and its strength maximized, by novel relationships between the metal cart frame and the basket which utilize the metal cart frame as a reinforcing member for the basket. Not only does this provide added strength to the plastic basket, but it allows the basket to be made of materials that would otherwise not be suitable.

An endless metal ring 250 encircles the upper portion of the basket. Ring 250 is illustrated in detail in FIG. 16, and its relationship with the other components is shown in FIGS. 1, 3, 5, 14 and 15. Looking first to FIG. 16, the major portion of ring 250 comprises a substantially circular cross-section having flattened sides, which is provided with a plurality of integral upstanding tabs 252. Ring 250 is received in channel 200 which surrounds the top periphery of side panels 182 and 184 and front panel 180. Shoulder 202 is provided with a plurality of upwardly extending opening 254. Tabs 252 of ring 250 are received in these opening 254 in order to interlock the basket 102 with ring 250. This arrangement is present for practically the entire length of recess 200, as illustrated in FIG. 5. Welded to the forward portion of ring 250 are a pair of metal bumpers 256 which extend upwardly beyond flanges 202 and 208. At the rear portion, the cross-section of ring 250 becomes completely circular, as shown in FIG. 14. At this point, adjacent to corner posts 162 and 164, recess 200 is provided with an inwardly extending rib 260 which bears against ring 250, as shown in FIG. 14. Ring 250 extends around corner posts 162 and 164 (FIG. 5), being received in the upper recesses 172, then curving around posts 162 and 164, and upwardly and finally across between the two posts. Ring 250 has, on each side, a first inwardly turned 90° bend 257, a second upwardly turned 90° bend 259, and a third inwardly turned 90° bend 261. By means of these bends, ring 250 bears upon the rear portion of posts 162 and 164, and establishes an inward pressure against the basket and the posts. This urges the rear edges 212 of the side panels into contact with the posts The pressure also tightly seats ring 250 in channel 200. The rear section 251 of ring 250 is provided with two pairs of outwardly extending tabs 262, which interact with the basket panel and the seat arrangement, as is explained below. Ring 250 provides rigid upper support for basket 102, and also secures the upper portion of basket 102 to corner posts 162 and 164, by means of recess 172.

Basket 102 is also attached to the lower portion of corner posts 162 and 164 by a generally U-shaped attachment member 240 that has a pair of legs 242, which terminate in inwardly oriented ends 244. The main portion of attachment member 240 is received in a channel 246 in the bottom panel 190 of the basket. By virtue of this relationship, attachment member 240 supports the rear edge of bottom panel 190. Leg portions 242 are received in 216 in side panels 182 and 184 (FIG. 11). Inwardly turned ends 244 are received in openings 218 of side panels 182 and 184. As best shown in FIGS. 4 and 11, legs 242 extend around rear corner posts 162 and 164, engaging the recesses 170. Thus, attachment member 240 locks the rear portion of basket 102 to corner posts 162 and 164. Attachment member 240 also pulls the lower portion of the basket toward the posts, firmly seating the posts in the concave rear edges 212. This insures against lateral movement of the rear portion of the basket with respect to the posts. Longitudinal movement along the posts is prevented by recesses 170. The center portion of attachment member 240 is seated in channel 246 of bottom panel 190, and serves to support the bottom panel.

The back panel 270 of basket 102 is not integral with the other panels. The back panel (FIG. 4) has a latticework portion 272 augmented by solid portions 274. Back panel 270 is provided with two leg openings 276 through which a child's legs can protrude when sitting in the seat. Back panel 270 is also provided with a pair of lower wire openings 282. At the bottom edge of back panel 270 are a pair of grooves 284. The side edges of back panel 270 converge, so that the back panel can swing upwardly to a horizontal position between the converging side panels 182 and 184.

Figure 17:
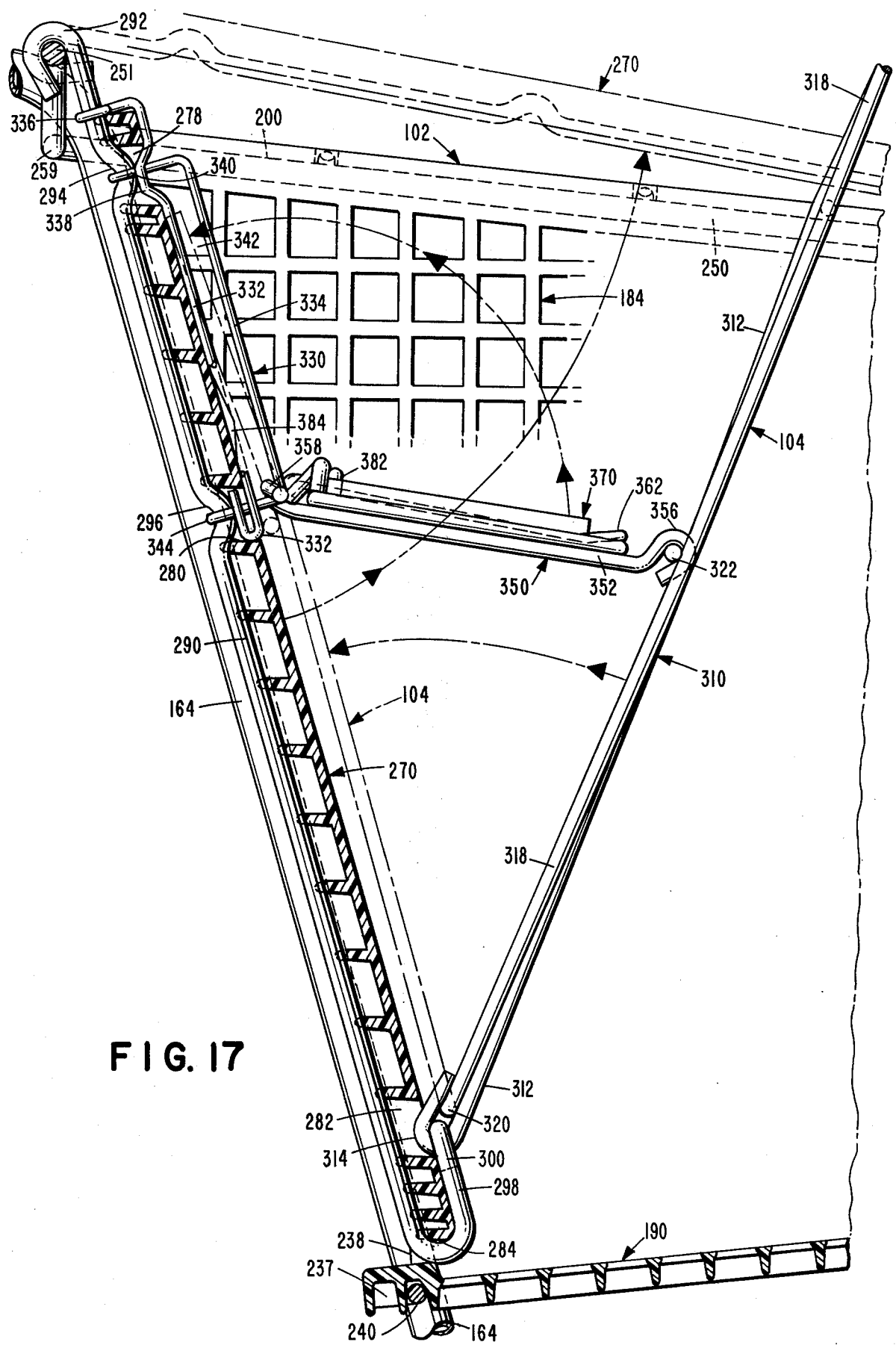
FIG. 17 is a sectional view of the folding child seat mechanism of the grocery cart taken along line 17—17 of FIG. 4.

The attachment of back panel 270 to the rest of the grocery cart is integrated uniquely with the mounting of the folding seat within the grocery cart basket and with the endless ring 250. This is best shown in FIG. 17. A pair of back panel support wires 290 are hooked at their upper ends 292 about ring portion 251 at a point inside the tabs 262. Each back panel support wire 290 is provided with a first curved portion 294 and a second curved portion 296, and they terminate in U-shaped portions 298 and loops 300. Curved portions 294 and 296 register, respectively, with upper openings 278 and middle openings 280 of back panel 270. The U-shaped portion 298 extends under back panel 270, passing through the recesses 284. This secures the lower edge of back panel 270. Back panel support wires 290 are not flush with the rear or outer surface of back panel 270, but are in a plane parallel to that of the outer surface of the back frame but spaced outwardly therefrom.

Figure 19:
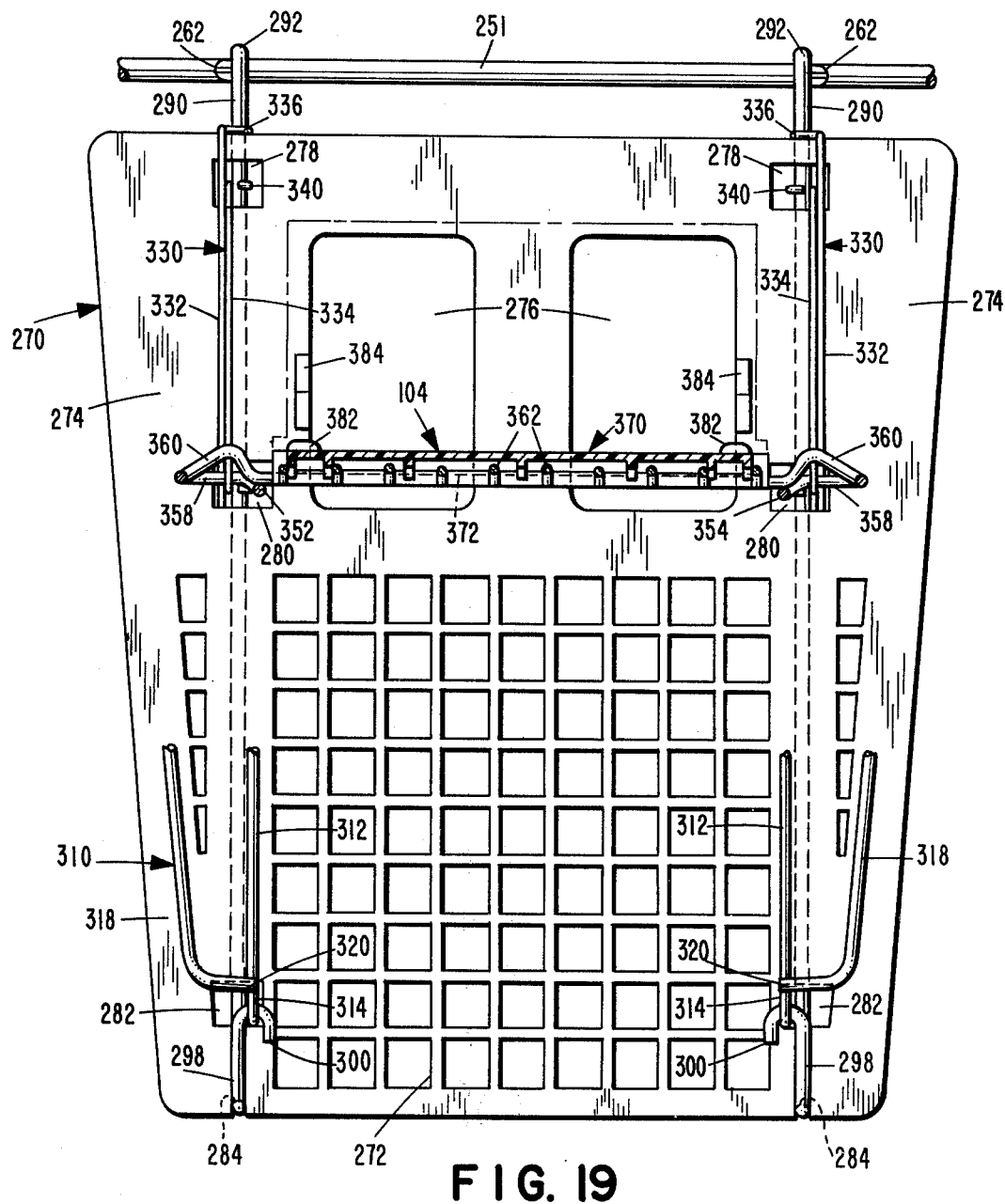
FIG. 19 is a rear view of the back panel of the grocery cart basket showing the child seat in the operating postion.
Figure 23:
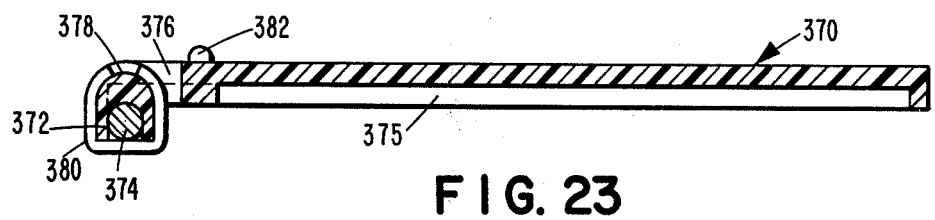
FIG. 23 is a sectional view taken along line 23—23 of FIG. 20, illustrating the connection between the seat panel of the child seat shown in FIG. 22 and the wire framework supporting it.
Figure 24:
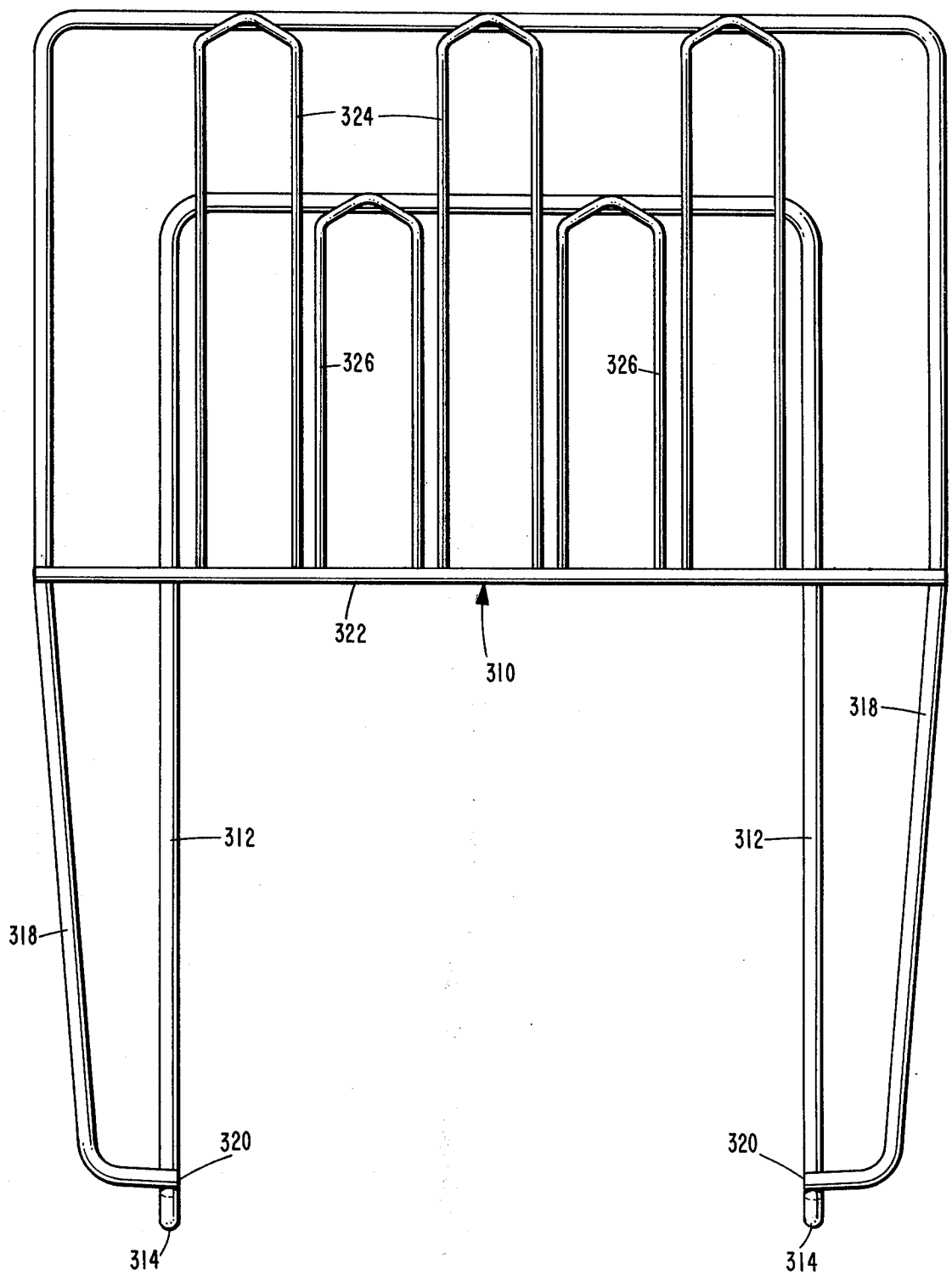
FIG. 24 is an elevational view of the movable portion of the framework that forms the back of the child seat.

The main seat back frame 310 of the child seat is shown in FIG. 24. It comprises a U-shaped inner seat member 312 which terminates at its free ends in loops 314. Attached to inner member 312 is an outer seat back member 318, also of generally U-shaped configuration, which is fastened at its free ends 320 to inner member 312. A horizontal brace 322 is fastened to both of members 312 and 318. Finally, a plurality of back support wires 324 and 326 are welded at appropriate positions to members 312 and 318. As is best shown in FIGS. 17 and 19, loops 314 of member 312 pass around hook portions 300 of back support wires 290, so that the child seat back 310 is pivotally mounted upon hooks 300. Movement of the seat back can then be made between two positions shown in FIG. 17.

As best shown in FIG. 17, a pair of runners indicated broadly at 330 perform the dual function of attaching back panel 270 to the support wires 290 and supporting the base portion of the child seat. Each runner 330 comprises an inner runner wire 332 and an outer runner wire 334. Inner runner wire 332 has at its upper end a loop 336 that encircles rear panel support wire 290 at a point above the upper edge of back panel 270. Then, proceeding downwardly, inner runner wire 332 has an inwardly oriented portion 338 that extends into opening 278 in back panel 270. Each inner runner wire 332 terminates at its lower end at opening 280. Each outer runner wire 334 has at its upper end a hook 340 that extends through opening 278 and then wraps around curved portion 294 of back panel support wire 290. Outer runner wire 334 is spaced slightly outwardly from inner runner wire 332, providing a runner space 342 therebetween. At its lower end, outer runner wire 334 has a second hook 344 that extends through opening 280 and wraps around back panel support wire 290 at curved portion 296. Inner runner wire 332 and outer runner wire 334 are attached together at points of crossing within openings 278 and 280. The resulting arrangement clamps the upper portion of back panel 270 between back panel support wires 290 and inner runner wires 332.

Figure 20:
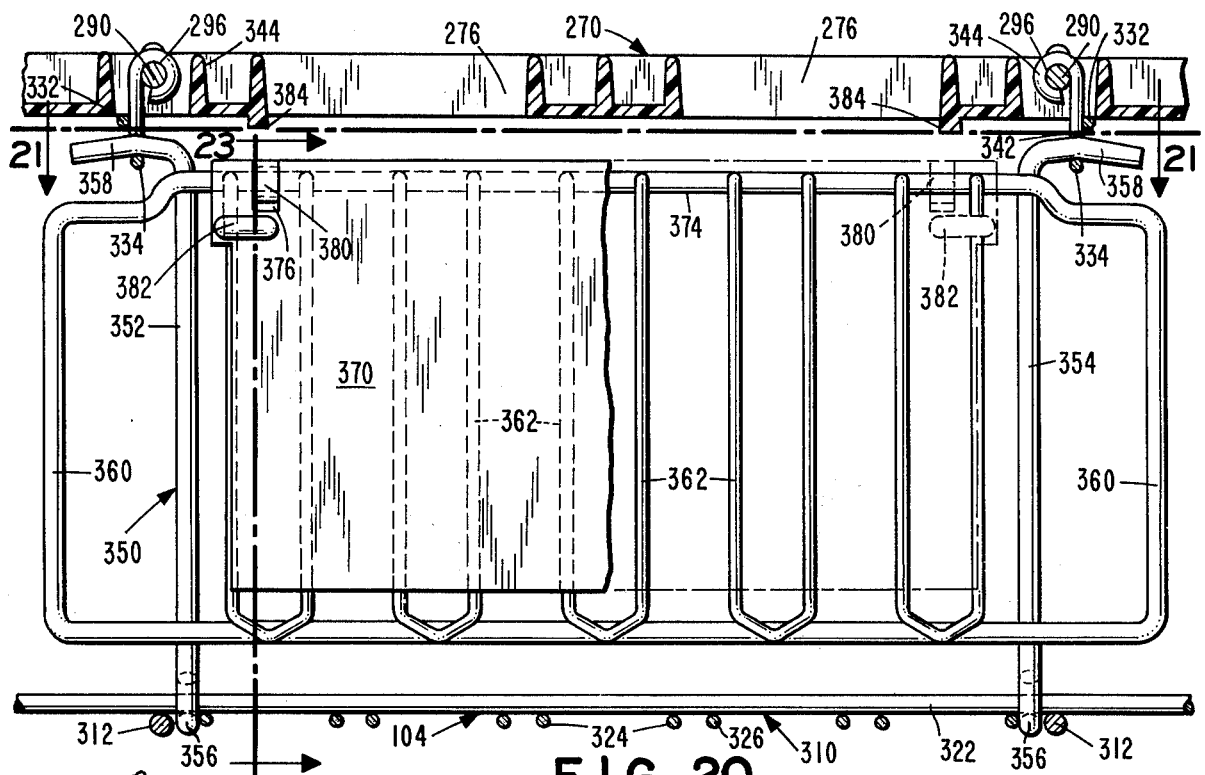
FIG. 20 is top view, partially in section, of the wire framework of the base of the child seat, taken along line 20—20 of FIG. 4.
Figure 21:
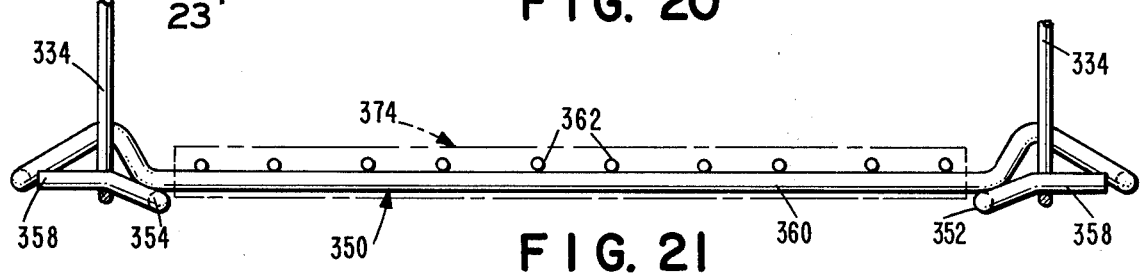
FIG. 21 is a view of the base portion of the child seat take along line 21—21 of FIG. 20.
Figure 22:
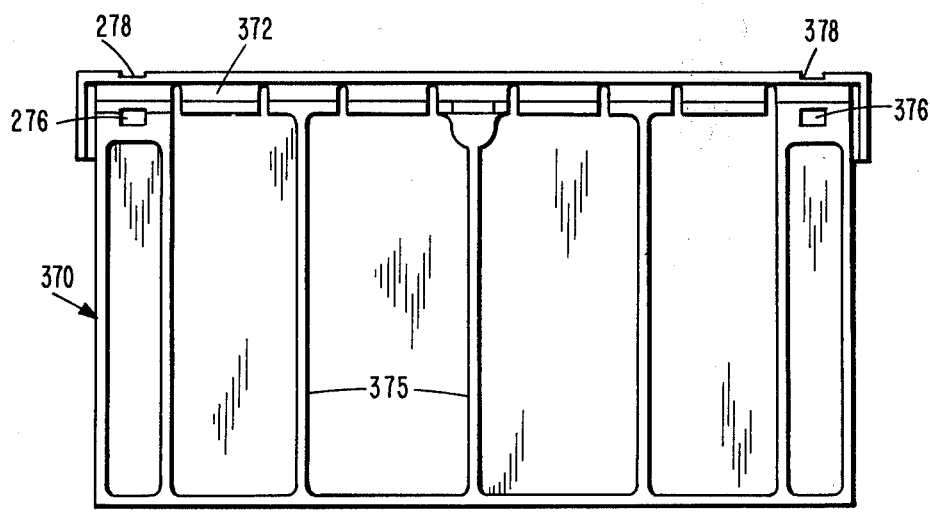
FIG. 22 is a bottom plan view of the plastic seat portion of the child seat.

The base of the child seat comprises a seat base frame 350. As best illustrated in FIG. 20, the seat base frame 350 comprises a pair of longitudinal support wires 352 and 354, each of which terminates at one end of a loop 356 which encircles brace 322 of the child seat back main frame 310. At their other ends, wires 352 and 354 terminate in outwardly oriented bends 358, which protrude into runner openings 342 formed between runner wires 332 and 334. A perimeter wire 360 defines the seat base in a generally rectangular configuration. Wires 352 and 354 are attached to perimeter wire 360 at points of crossing. Attached to the perimeter wire 360 are a plurality of U-shaped seat wires 362. Seat panel 370 is provided with a recess 372 which fits over portion 374 of wire 360. It has suitable ribs 375 for strength, as well as a pair of openings 376 and cooperating indentations 378. A pair of attachment rings 380, received in openings 376 and indentations 278, encircle wire 360 to pivotally attach seat panel 370. Thus, the seat panel 370 can be pivoted to a position in which a child can sit upon it, as shown in FIG. 17 in the solid lines, and also to a second position wherein it closes the leg openings 276, as shown in dotted lines in FIG. 17, to enable articles to be placed in the seat. Child seat frame 310 can be pivoted between the operative position shown in solid lines in FIG. 17 and the inoperative position shown in broken lines. The child seat pivots upwardly, along with back panel 270, to the position shown in broken lines in FIG. 17, to allow a plurality of grocery baskets to be nested. To insure that seat panel 370 folds properly when the child seat is moved to the folded position with seat panel 370 in its upper position, seat panel 370 is provided with a pair of raised followers 382 (FIG. 17) that engage raised cams 384 on the inside of back panel, 270, adjacent to the leg openings. As the child seat is folded, this causes seat panel 370 to move to its lower position.

Grocery carts are commonly stored nested with one another. Nesting and unnesting a cart causes wear and damage. In the case of the cart herein described, certain precautions have been taken to prevent such wear and damage to the basket. The protection has been provided by a novel interrelationship of elements. As set forth above, the upper edge of the basket is provided with a pair of metal bumpers 256. Bumpers 256 are aligned with back panel support wires 290. Thus, during nesting, bumpers 256 engage the back side of the back panel support wires 290 of the next forward cart, camming the back panel upwardly without plastic-to-plastic contact. This also reduces the force necessary to nest one cart inside another.

One of the novel features of this invention is the fact that the plastic basket can easily be replaced if it is damaged. As mentioned in the opening paragraphs of this specification, one of the disadvantages of a wire basket is that, once broken, it is difficult and expensive to repair, if it can at all be repaired. If the plastic basket of this invention becomes damaged, it can easily be removed and replaced. To remove the basket, it is simply broken into pieces and separated from the frame. A new basket consists of two parts, one or both of which can be replaced at any time. The main portion consists of the integral two side panels 182 and 184, front panel 180, and bottom panel 190. To install this portion, the U-shaped bottom interlocking wire 240 is removed by bending outwardly one of the curved end portions 242. Then, rivets 236 are either totally removed or the head portions cut off. With ring 250 in place in recesses 172, the new basket is deformed inwardly and inserted through ring 250, with the ring finally being forced into recess 200. This is best done by placing the ring in that part of recess 200 that is in front panel 180, and then forcing the rear portion of the basket downwardly within ring 250, until ring 250 enters recess 200, and channels 212 are seated against corner posts 162 and 164. Tabs 252 of ring 250 are then urged into openings 254. Lower attachment member 240 is repositioned and its end portion 242, previously bent open is now clamped closed. Finally, new rivets 236 are installed.

A damaged back panel can be replaced by straightening hooks 340 and 344 to detach the runners from the back panel. U-shaped portions 298 are opened slightly. The old panel is simply removed and the new one put in place. The hooks are then reattached, and portions 298 bent back into shape.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:
1. A cart comprising:
a cart frame having wheels and a pair of upstanding posts,
a plastic basket comprising a pair of side panels, a front panel, and a bottom panel, all of which are attached to one another, and a back panel, said basket abutting said pair of upstanding posts,
an endless metal reinforcing ring means extending along said side panels and said front panel and around each of said posts to hold said basket against said posts, and
means for preventing relative movement of said ring means with respect to said basket.
2. The cart of claim 1 wherein said side panels, said front panel, and said bottom panel are integrally molded with one another, and are principally of open lattice construction.
3. The cart of claim 1 wherein said ring means is adjacent to the upper edges of said side panels and said front panel, and further comprising lower basket attaching means engaging each of said side panels at a point adjacent to the lower portion of the rear edges thereof and engaging said posts to maintain said basket in abutting relationship with said posts.

4. A cart comprising:
a cart frame having wheels and a pair of upstanding posts having at least portions with a first substantially horizontal cross-sectional configuration,
a plastic basket comprising a pair of side panels, a front panel, and a bottom panel, all of which are attached to one another, and a back panel, each of said side panels terminating in a rear edge having at least portions with a second substantially horizontal cross-sectional configuration that abuts one of said posts; one of said cross-sectional configuration comprising a recess and the other of said cross-sectional configurations comprising a projection received within said recess,
metal reinforcing ring means extending along said side panels and said front panel and engaging each of said posts in such a manner as to hold said first and second cross-sectional configurations in conforming relationship with one another, and
means for preventing relative movement of said ring means with respect to said basket.

5. A cart comprising:
a wheeled cart frame having a pair of upstanding, spaced rear posts and handle means carried by said posts,
a plastic basket comprising a pair of opposed side panels a front panel, a bottom panel and a rear panel, said side panels, front panel, and bottom panel being attached together along their contiguous edges, each of said side panels terminating in a rear edge in abutting relationship with a respective one of said rear posts,
an endless metal reinforcing ring mounted on and extending around the upper portion of said side panels and said front panel, said endless ring also extending around said rear posts to maintain said rear edges in abutting relationship with said rear posts,
rear panel attachment means for pivotally attaching said rear panel to said frame whereby said rear panel is in opposed relationship to said front panel and is pivotable between said side panels, and
lower basket attaching means engaging each of said side panels in the lower portion of each said rear edge and engaging said rear posts to maintain said rear edges in abutting relationship with said rear posts.

6. The cart of claim 5 further comprising basket support means mounted on said cart frame and engaging said bottom panel at a point intermediate the length thereof and extending across at least a portion of the width thereof to support said bottom panel.

7. The cart of claim 6 further comprising means defining a basket support channel on the underside of said bottom panel, said basket support means being positioned in said basket support channel.

8. The cart of claim 7 wherein said basket support means is a tubelike member disposed transversely to said bottom panel and wherein said basket support channel is defined along its sides by a plurality of spaced ribs in abutting relationship with said basket support means and at its ends by downwardly oriented protuberances, generally aligned with said side panels and engaging said basket support means.

9. The cart of claim 5 wherein at least portions of the substantially horizontal cross-sectional configuration of said rear posts conform with portions of the substantially horizontal cross-sectional configuration of said rear edges of said side panels to prevent lateral movement of said side panels with respect to said rear posts.

10. The cart of claim 9 wherein at least portion of the cross-sectional configuration of each of said rear edges comprises an inwardly contoured channel and the cross-sectional configuration of said portions of said rear posts is outwardly contoured and is received in said channel.

11. The cart of claim 5 wherein each of said side panels and said front panel further comprise shoulder means, said endless ring lying alongside said shoulder means, said shoulder means including a plurality of spaced generally vertically oriented openings around said side panels and said front panel, said endless ring comprising a plurality of generally vertically oriented tabs protruding into said openings to prevent substantial horizontal movement of said side panels and said front panel with respect to said endless ring.

12. The cart of claim 11 wherein each of said rear posts comprises a first recess for receiving said endless ring to prevent movement of said endless ring axially along said rear post.

13. The cart of claim 11 wherein said endless ring is bent around each said rear posts and is in pressure contact with each said rear post at a point on the opposite side of said rear posts from said rear edge of said side panel, whereby said endless ring urges said rear edges into contact with said rear posts.

14. The cart of claim 13 wherein said lower basket attaching means comprises a substantially U-shaped lower attachment rod in which each of the free ends comprises an inwardly oriented stub portion, and wherein each said side panel comprises a stub opening in the lower portion thereof adjacent to said rear edge, said stub portions engaging said stub openings, said U-shaped attachment rod passing around said rear posts in pressure contact therewith, whereby said attachment rod urges said rear edges into contact with said rear posts.

15. The cart of claim 14 wherein said bottom panel comprises a rear groove along the underside in the rear portion thereof, the base portion of said U-shaped attachment rod being received in said rear groove, whereby said bottom panel is supported by said U-shaped attachment rod.

16. The cart of claim 5 wherein said rear panel attachment means comprises a pair of generally vertically oriented rear panel support wires attached to said rear panel on the outside thereof and being substantially parallel to the outside surface of said rear panel but lying in a plane spaced outwardly of the plane of the outside surface of said rear panel, each of said rear support wires being substantially coextensive with said back panel and extending upwardly beyond said back panel and being pivotally attached to said endless ring at points between said rear posts, said cart further comprising a pair of metal bumpers attached to said front panel adjacent to the upper edge thereof and aligned horizontally with said back panel support wires, whereby when a plurality of said carts are nested with one another, said bumpers of one cart contact said back panel support wires of another cart to protect said back panel during nesting and unnesting.

17. The cart of claim 16 wherein said bumpers are mounted on said endless ring.

18. The cart of claim 16 further comprising a child seat carried by said rear panel, said child seat comprising a seat back frame pivotally attached at the bottom portion thereof to said back panel support wires, a seat base frame attached at one edge to said seat back frame and at another opposite edge to said back panel suport wires, said back panel comprising at least one leg opening for accommodating the legs of a child sitting in said child seat, said child seat further comprising a seat base panel pivotally attached to said seat base frame and movable between a first position in juxtaposition to said seat base frame and a second position covering said leg openings.

19. The cart of claim 18 wherein said seat base frame is pivotally attached to said seat back frame, and further comprising two pairs of spaced parallel generally vertically oriented inner and outer runner wires attached to said back panel support wires, said seat base frame comprising a pair of legs disposed between said inner and outer runner wires of each said pair and slidable therebetween.

20. The cart of claim 19 wherein at least one of said runner wires of each said pair extends through said back panel and is attached to said back panel support wires, and wherein at least a portion of said inner runner wire of each said pair is in contact with the inner surface of said back panel to clamp said back panel between said back panel support wires and said inner runner wires.

21. The cart of claim 20 wherein each of said back panel support wires has a U-shaped portion extending around the bottom edge of said back panel, and wherein said seat back frame is pivotally attached to said U-shaped portion.

22. A plastic basket for use with a wheeled cart frame which has upstanding posts to which said basket is to be attached, said basket comprising:
   a pair of opposed side panels, a front panel, and a bottom panel attached together at their contiguous edges,
   a pair of spaced, parallel shoulders on said side panels and said front panel to define a channel encircling said side panels and said front panel for receiving a ring used to attach said basket to the posts of the cart frame, and
   a back panel positionable in opposed relationship to said front panel.

23. The basket of claim 22 further comprising a plurality of openings in one of said shoulders to receive locking tabs carried by the ring.

24. The basket of claim 22 wherein said channel is around the upper edge of said side panels and said front panel.

25. The basket of claim 22 wherein each of said side panels terminates in a rear edge, at least portions of each of said rear edges having a cross-sectional configuration that will interlock with the cross-sectional configuration of the frame posts when said rear edges are placed in abutting relationshipwith said frame posts, to prevent lateral movement of said rear edges with respect to the frame posts.

26. The basket of claim 25 further comprising an attachment opening in each of said side panels adjacent to the lower portion of said rear edge thereof for receiving an attachement member to attach said side panels to the frame posts.

27. The basket of claim 25 further comprising a rear groove in the underside of said bottom panel adjacent to the rear edge thereof for receiving a basket attachment member.

28. The basket of claim 25 further comprising a basket support channel in said bottom panel disposed at a point intermediate the length thereof and extending across at least a portion of the width thereof, said basket support channel being defined along its sides by a plurality of ribs and at its ends by downwardly oriented protuberances, said ribs and said protuberances being engageable by a basket support means mounted on said cart frame.

29. The basket of claim 22 wherein said panels are all substantially entirely of open latticework construction, and wherein said side panels, said front panel, and said bottom panel are integral with one another.

30. The basket of claim 22 wherein said back panel is not attached to said side panels, said front panel, or said bottom panel, and wherein said back panel comprises a first pair of laterally spaced attachment openings near the top edge thereof and a second pair of laterally spaced attachment openings located intermediate in said back panel, for receiving means for attaching said back panel to said cart frame.

31. The basket of claim 30 wherein said back panel further comprises at least one leg opening for receiving the legs of a child when a child seat is installed in said basket.

32. A basket assembly for a cart having a wheeled frame and a pair of upstanding frame posts to which said basket is to be attached, said basket assembly comprising:
   a pair of spaced, opposed side panels, a front panel, and a bottom panel attached together at contiguous edges, said side panels each terminating in a rear edge,
   means defining a channel on said side panels and said front panel, said channel encircling said side panels and said front panels,
   an endless metal ring positioned in said channel and extending a predetermined distance beyond said rear edges of said side panels in order to pass around the posts of said cart frame, and
   a back panel for said basket positionable in opposed relationship to said front panel.

33. The basket assembly of claim 32 wherein at least portion of each of said rear edges have a cross-sectional configuration that will interlock with the cross-sectional configuration of said frame posts when placed in abutting relationship with said frame posts, the predetermined distance said endless ring extends beyond said rear edge being such that said posts are held under pressure between said endless ring and said rear edges.

34. The basket assembly of claim 33 further comprising a metal lower basket attachment member engageable with attachment openings in the lower portion of each of said side panels adjacent to said rear edges, said attachment member extending beyond said rear edges a distance sufficient to encircle said frame posts and hold said frame posts under pressure between said attachment member and said rear edges.

35. The basket assembly of claim 34 wherein said attachment member comprises a generally U-shaped rod having inwardly turned free ends to engage said attachment openings.

36. The basket assembly of claim 35 further comprising a downwardly opening support channel in the underside of said bottom panel adjacent to the rear edge thereof, wherein said attachment member passes through said channel to provide support for said bottom panel.

37. The basket assembly of claim 33 further comprising a pair of generally vertical back panel suport wires attached to the outside rear surface of said back panel and pivotally attached to said endless ring at a point opposite said front panel.

38. The basket assembly of claim 37 further comprising a child seat attached to said rear panel support wires.

39. The basket assembly of claim 38 wherein said back panel comprises first and second pairs of laterally spaced opening aligned with said back panel support wires, and wherein said child seat comprises slide means extending through said openings and being attached to said back panel support wires.

40. The basket assembly of claim 39 wherein each of said back panel support wires has a U-shaped portion extending around the bottom edge of said back panel, and wherein said child seat comprises slide means extending through said openings and being attached to said back panel support wires.

41. The basket assembly of claim 38 wherein said back panel support wires lie in a plane generally parallel to but spaced outwardly of the plane of the outer rear surface of said back panel, and further comprising bumper means at said front panel aligned with said back panel support wires to contact the back panel support wires of an adjacent basket during nesting.

42. The basket assembly of claim 41 wherein said bumper means are of metal construction and are attached to said endless ring.

43. A cart comprising:
a metal frame having wheels, a pair of spaced upstanding rear corner posts with a handle attached thereto, and an upstanding basket support means,
a plastic basket having a pair of opposed side panels, a front panel and a bottom panel, said panels being substantially entirely of open lattice construction and being integral with one another, said side panels each terminating in a rear edge, said rear edges being in abutting relationship with said rear corner posts and being so contoured in cross-section at least in some portions as to interlock with the cross-section of said rear corner posts, said basket support member engaging the underside of said bottom panel along at least a portion of the width of said bottom panel and being attached thereto,
an endless metal ring encircling sad side panels, said front panel, and said rear corner posts, said endless ring exerting inward pressure to urge said rear edges into contact with said rear corner posts,
a metal lower basket attachment member in engagement with the lower portion of each of said side panels at a point adjacent to said rear edges and passing around said rear corner posts, said attachment member exerting pressure on said basket and said rear corner posts to urge said rear edges into contact with said rear corner posts,
a plastic back panel of predominantly open lattice construction positioned in opposed relationship to said front panel, and
back panel mounting means attached to said back panel and pivotally attached to said endless ring at a point between said rear corner posts.

44. The cart of claim 43 further comprising shoulder means defining a channel around the upper edges of said side panels and said front panel, said endless ring being positioned in said channel.

45. The cart of claim 44 further comprising a plurality of generally vertically oriented openings in said shoulder means and a plurality of tabs on said endless band, said tabs protruding into said openings to prevent lateral deflection of said side panels and said front panel with respect to said endless ring.

46. The cart of claim 43 further comprising a pair of generally vertical back panel support wires attached to said back panel and pivotally attached to said endless ring, said back panel support wires being in a plane substantially parallel to but spaced outwardly of the plane of the outer surface of sad back panel, and a pair of metal bumpers attached to said endless ring and aligned laterally with said back panel support wires, whereby when a pair of said carts are nested, said bumpers of one cart will contact said back panel support wires of the other cart to cause pivoting of said back panel upwardly.

47. The cart of claim 43 further comprising a downwardly facing laterally extending rear groove on the rear portion of said bottom panel, and wherein said lower basket attachment member comprises a generally U-shaped rod, the base portion of said U-shaped rod extending through said rear groove to support said bottom panel.

48. The cart of claim 43 further comprising a pair of laterally spaced generally vertical back panel support wires attached to said back panel and pivotally attached to said endless ring at a point between said rear corner posts, and a child seat pivotally attached to said back panel support wires.

49. The cart of claim 48 wherein said child seat comprises a pair of seat slides having slide wires extending through said back panel and being attached to said back panel support wires, at least one of said slide wires being disposed parallel to and against the inner surface of said back panel, whereby said back panel is held between said back panel support wires and said one of said slide wires.

50. The cart of claim 49 wherein each of said back panel support wires has a U-shaped portion extending around the lower edge of said back panel to hold said back panel therein, and wherein said child seat is pivotally attached to said U-shaped portion.

51. The cart of claim 43 further comprising a basket support channel in said bottom panel disposed at a point intermediate the length thereof and extending across the width thereof, said basket support member being received in said basket support channel, said basket support channel being defined along its sides by a plurality of spaced ribs abutting said basket support member and at its ends by downwardly oriented protuberances engageable with said basket support member.

* * * * *